Figure 1:
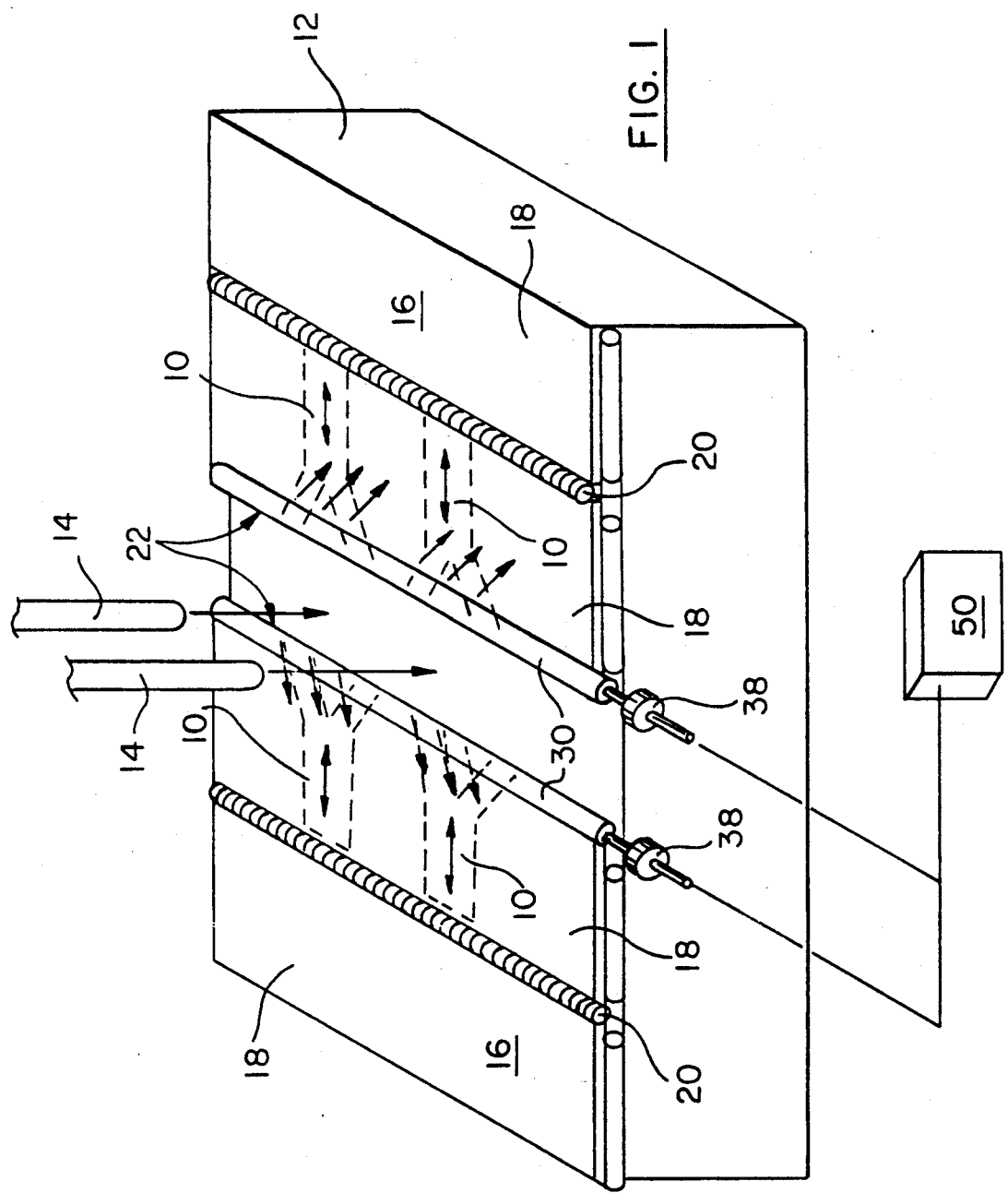

United States Patent [19]
Wright

[11] Patent Number: 5,207,815
[45] Date of Patent: May 4, 1993

[54] MECHANISM FOR SHEARING DISCRETE GOBS OF MOLTEN GLASS

[75] Inventor: Douglas W. Wright, Bloomfield, Conn.

[73] Assignee: Emhart Glass Machinery Investments Inc., Wilmington, Del.

[21] Appl. No.: 813,340

[22] Filed: Dec. 24, 1991

[51] Int. Cl.$^5$ .................... C03B 7/10; C03B 7/12; B26D 7/08
[52] U.S. Cl. ........................ 65/332; 65/334; 65/355; 239/566; 83/169; 83/171
[58] Field of Search .............. 65/332, 334, 355, 304; 239/566, 567, 568, 587.1; 83/169, 171

[56] References Cited

U.S. PATENT DOCUMENTS

| | | | |
|---|---|---|---|
| 1,760,255 | 5/1930 | Peiler | 65/334 |
| 2,754,627 | 7/1956 | Denman | 65/334 |
| 3,059,861 | 10/1962 | Umbricht et al. | 239/566 |
| 3,237,872 | 3/1966 | Mincy | 239/566 |
| 4,083,278 | 4/1978 | Steffan | 83/171 |
| 4,813,994 | 3/1989 | Kulig | 65/334 |
| 4,859,227 | 8/1989 | Wright | 65/334 |
| 4,924,740 | 5/1990 | Wright | 65/334 |
| 4,944,207 | 7/1990 | Nebelung et al. | 83/169 |

Primary Examiner—W. Gary Jones
Assistant Examiner—Steven P. Griffin
Attorney, Agent, or Firm—Spencer T. Smith

[57] ABSTRACT

Shears are supported for reciprocating displacement within an open frame so that they can be conjointly displaced from retracted positions to advanced overlapping positions where a runner of molten glass will be severed. A pair of covers close the open frame except for the central portion where the runners pass through. A pipe having a plurality of holes is secured to the front edge of the covers so that coolant can be directed downwardly and inwardly against the reciprocating shears.

2 Claims, 2 Drawing Sheets

MECHANISM FOR SHEARING DISCRETE GOBS OF MOLTEN GLASS

In conventional glassware forming machines the ware is formed from a gob of molten glass sheared from a molten runner discharged from a feeder. The shears will heat up due to direct contact with the molten gob and from radiant heating.

U.S. Pat. Nos. 4,813,994; 4,859,227 and 4,924,740 disclose conventional shear mechanisms.

It is an object of the present invention to provide a very effective structure for cooling the shear blades.

Other objects and advantages of the present invention will become apparent from the following portion of this specification and from the accompanying drawings which illustrate in accordance with the mandate of the patent statutes a presently preferred embodiment incorporating the principles of the invention.

Figure 2:
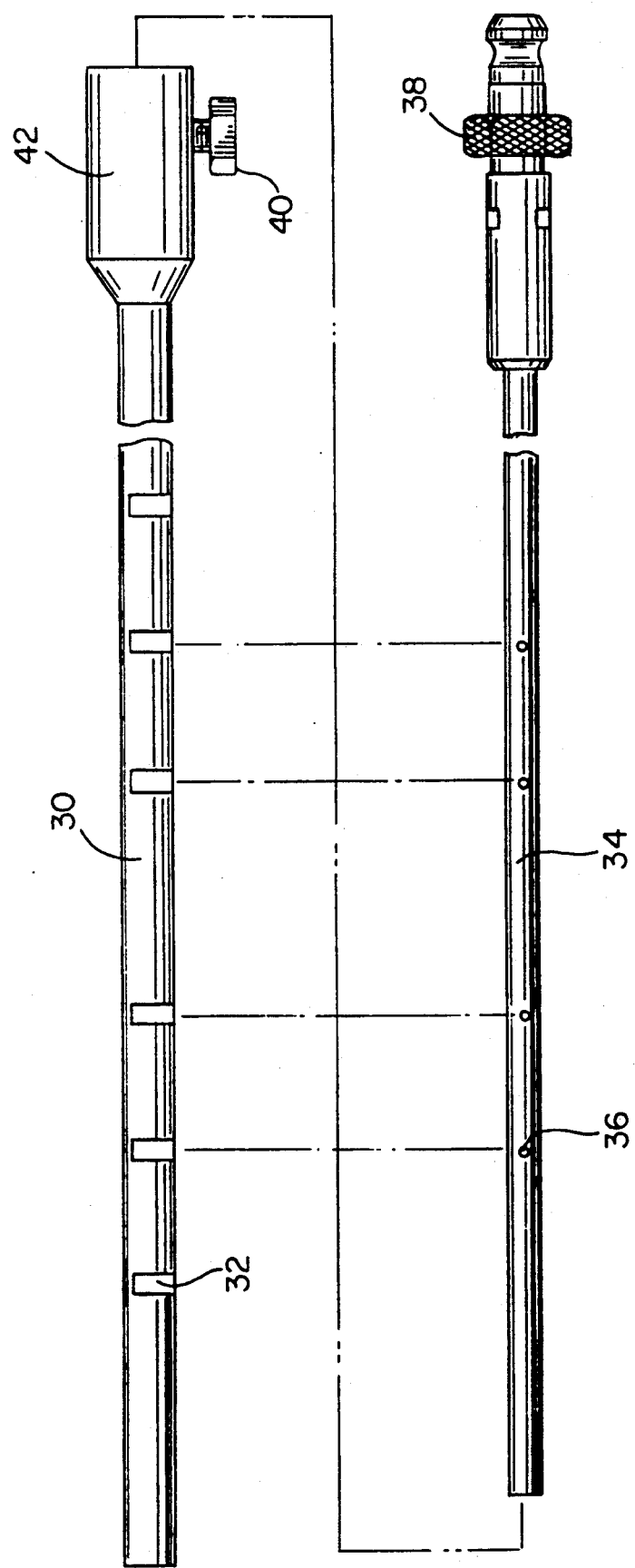

Referring to the drawings:

FIG. 1 is an oblique view of a shear mechanism made in accordance with the teachings of the present invention; and FIG. 2 is an elevational view of one of the cooling tube assemblies shown in FIG. 1.

The shear mechanism has pairs of opposed shears 10 which are supported within a housing 12 for reciprocating displacement (indicated in FIG. 1 by the double ended arrows) between retracted and advanced positions. A pair of shears, when advanced, shears a discrete gob of molten glass from a runner of molten glass 14 supplied from a suitable feeder (not shown) (which moves downwardly as indicated by the vertical arrows in FIG. 1). The open top of the housing is partially closed by a pair of covers 16, each of which is made up of two panels 18 joined together by a hinge 20. The front edge 22 of each cover 16 extends transverse to the direction of shear movement and overlies the shears at their retracted positions as shown in FIG. 1.

Secured to the bottom of the cover and defining the front edge 22 is a tube conduit 30 (FIG. 2) having a plurality of radial slots 32 which extend through the lower quadrant facing the associate shears at their retracted position. Within this tube conduit is located a coolant delivery pipe 34 having a set of holes 36 located to correspond with the number and location of the shears. This will minimize pressure losses due to coolant being forced to areas without need. The delivery pipe has a knurled knob 38 located outside the partially closed housing adjacent the tube conduit 30, for rotating the delivery pipe to set the angle of holes 36 at the desired angle which can lie within the angular range of the radial slots 32 which extend through the lower quadrant of the tube facing the shears at their retracted position (rearwardly and downwardly as shown by the arrows in FIG. 1) and the pipe is held in this axial position with the holes and slots aligned and oriented at the desired angle by a set screw 40 which is received by a threaded hole in the enlarged end 42 of the tube conduit 30.

Coolant which can be air or water or a mixture of air and water, for example, is supplied from a suitable source 50.

I claim:

1. A shear mechanism for shearing discrete gobs from at least one runner of molten glass comprising
   a housing, open at the top,
   at least one pair of opposed shears supported within said housing for reciprocating displacement from a retracted position to an advanced position,
   a pair of covers for partially closing said open housing and overlying said retracted shears, said covers including opposed spaced front edges extending transverse to the direction of displacement of said shears,
   conduit means secured to each of said front edges of said covers for directing coolant downwardly in a selected direction against said retracted shears, and including setting means for setting said direction within a selected range,
   said setting means being selectively located outside said partially closed housing.

2. A shear mechanism according to claim 1, wherein said conduit means comprises
   a tube having a plurality of radial slots extending through a lower quadrant facing said retracted shears,
   a delivery pipe located within said tube having a plurality of holes axially aligned with at least some of said radial slots, and
   means for securing said tube and said delivery pipe together with said holes and said radial slots in axial alignment and with said holes at said selected location within said radial slots.

* * * * *